(12) United States Patent
Watson

(10) Patent No.: US 7,900,944 B2
(45) Date of Patent: Mar. 8, 2011

(54) RETRACTABLE VEHICLE STEP

(75) Inventor: Brad E. Watson, Barrie (CA)

(73) Assignee: Magna International Inc., Aurora (CA)

( * ) Notice: Subject to any disclaimer, the term of this patent is extended or adjusted under 35 U.S.C. 154(b) by 683 days.

(21) Appl. No.: 11/839,570

(22) Filed: Aug. 16, 2007

(65) Prior Publication Data

US 2008/0042395 A1    Feb. 21, 2008

Related U.S. Application Data

(60) Provisional application No. 60/838,824, filed on Aug. 18, 2006.

(51) Int. Cl.
*B60R 3/02* (2006.01)
(52) U.S. Cl. ........................................................ 280/166
(58) Field of Classification Search ................. 280/163, 280/164.1, 166; 182/127
See application file for complete search history.

(56) References Cited

U.S. PATENT DOCUMENTS

| | | | | | |
|---|---|---|---|---|---|
| 588,417 | A | * | 8/1897 | Garstang et al. | 105/447 |
| 1,193,466 | A | * | 8/1916 | Mealer | 105/447 |
| 1,242,828 | A | * | 10/1917 | Lyle | 105/448 |
| 1,474,257 | A | * | 11/1923 | Harrison et al. | 105/430 |
| 2,415,341 | A | * | 2/1947 | Dean | 105/430 |
| 3,403,926 | A | * | 10/1968 | Way et al. | 280/166 |
| 4,020,920 | A | * | 5/1977 | Abbott | 182/19 |
| 5,842,709 | A | * | 12/1998 | Maccabee | 280/166 |
| 2003/0132595 | A1 | * | 7/2003 | Fabiano et al. | 280/166 |

* cited by examiner

*Primary Examiner* — Frank B Vanaman
(74) *Attorney, Agent, or Firm* — Clark Hill, P.L.C.

(57) ABSTRACT

A step assembly is provided for a motor vehicle. The step assembly includes a mounting bracket adapted to be attached to the motor vehicle. The step assembly also includes a step and an arm having a first end pivotal with respect to the mounting bracket and an opposing second end pivotal with respect to the step for pivotally moving the step between a retracted position and an extended position. A latch assembly is coupled to the mounting bracket and operably coupled to the arm. The latch assembly selectively prevents pivotal movement of the arm to retain the step in the retracted position.

13 Claims, 6 Drawing Sheets

RETRACTABLE VEHICLE STEP

CROSS-REFERENCE TO RELATED APPLICATION

This application claims the benefit of and priority to U.S. provisional Application Ser. No. 60/838,824, filed Aug. 18, 2006 and entitled "Retractable Vehicle Step."

BACKGROUND

The invention relates to a step assembly for a motor vehicle. More particularly, the invention relates to a step assembly including a step movable between a retracted position and an extended position.

It is well-known in the art to provide fixed running boards or fixed step assemblies alongside a motor vehicle to assist individuals in either entering and exiting or accessing a motor vehicle having a high ground clearance. These fixed running boards are, however, often placed at a height that is not practical for large number of users. In addition, these fixed running boards are susceptible to dirt and mud accumulation, which can then be easily transferred to a user's clothing. Moreover, these fixed running boards reduce the ground clearance for the motor vehicle and, as such, can be damaged during off-road motor vehicle operation.

As an alternative to such fixed running boards, retractable running boards or step assemblies have been developed. These so-called retractable running boards are generally movable between a retracted position, in which a step is tucked underneath an underbody of the motor vehicle, and an extended position, in which the step is spaced apart from the underbody of the motor vehicle for supporting the user.

SUMMARY

According to one aspect of the invention, a step assembly for a motor vehicle includes a mounting bracket adapted to be attached to the motor vehicle. The step assembly includes a step, and an arm having a first end pivotal with respect to the mounting bracket and an opposing second end pivotal with respect to the step for pivotally moving the step between a retracted position and an extended position. A latch assembly is operably coupled to the arm for selectively preventing pivotal movement of the arm in order to retain the step in the retracted position.

According to another aspect of the invention, a step assembly for a motor vehicle includes a mounting bracket adapted to be attached to the motor vehicle. The step assembly includes a step, and an arm having a first end pivotal with respect to the mounting bracket and a second end pivotally coupled to the step for moving the step between a retracted position and an extended position. A drive shaft is fixedly secured to the first end of the arm and rotatable relative to the mounting bracket. A pinion is operably connected to the drive shaft and rotatable in response to rotation of the drive shaft. A rack link includes a plurality of teeth engaging the pinion. The rack link moves linearly relative to the pinion as the pinion rotates to provide controlled movement of the step between the retracted and extended positions.

According to yet another aspect of the invention, a step assembly for a motor vehicle includes a mounting bracket adapted to be attached to the motor vehicle. The step assembly includes a step, and an arm including a first end pivotal with respect to the mounting bracket and an opposing second end pivotally coupled to the step for moving the step between a retracted position and an extended position. A rack link includes one end coupled to the mounting bracket and an opposing end coupled to the step. The rack link is movable in a linear direction as the step moves between the retracted position and the extended position.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENT

Figure 1:
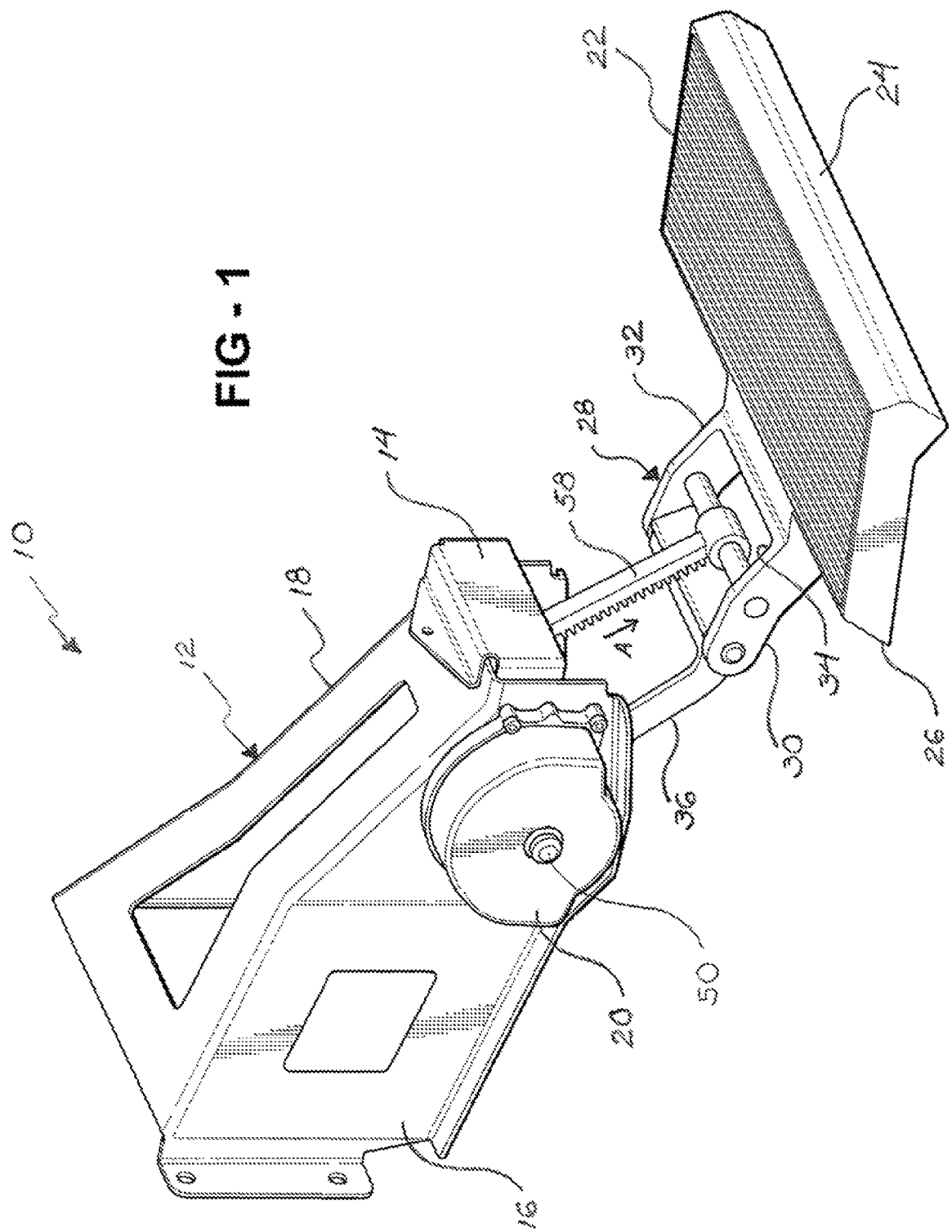
FIG. 1 is a perspective view of a step assembly according to one embodiment including a step in an extended position.
Figure 2:
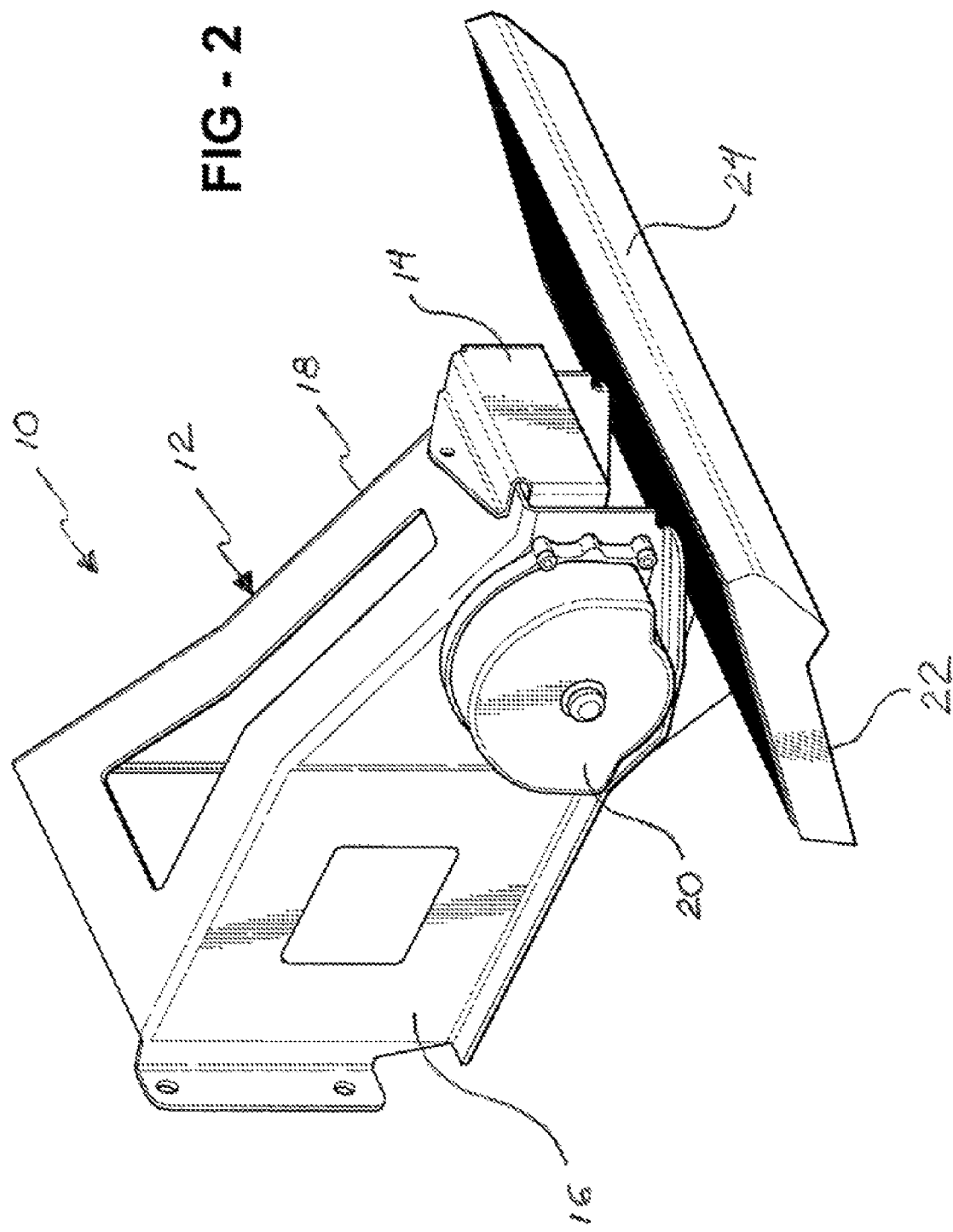
FIG. 2 is a perspective view of the step assembly including the step in a retracted position.

Referring to FIGS. 1 and 2, a step assembly, generally shown at 10, is provided for assisting individuals entering or exiting a motor vehicle. The step assembly 10 includes a mounting bracket, generally indicated at 12, adapted to be fixedly secured to an underbody of the motor vehicle. The mounting bracket 12 includes an outboard panel member 14 disposed between a pair of spaced apart sides 16, 18. A cover member 20 is fixedly secured to one side 16 of the mounting bracket 12.

The mounting bracket 12 mounts a step 22 to the motor vehicle. The particular size of the step 22 may vary. The step 22 includes an outboard end 24 and an opposing inboard end 26. The step 22 also includes a link, generally indicated at 28, extending out from the inboard end 26 thereof. The link 28 includes a pair of spaced apart link members 30, 32 defining a link cavity 34 therebetween. The step 22 and the link 28 may be formed as a single member or as two separate members fixedly secured to one another.

Figure 3:
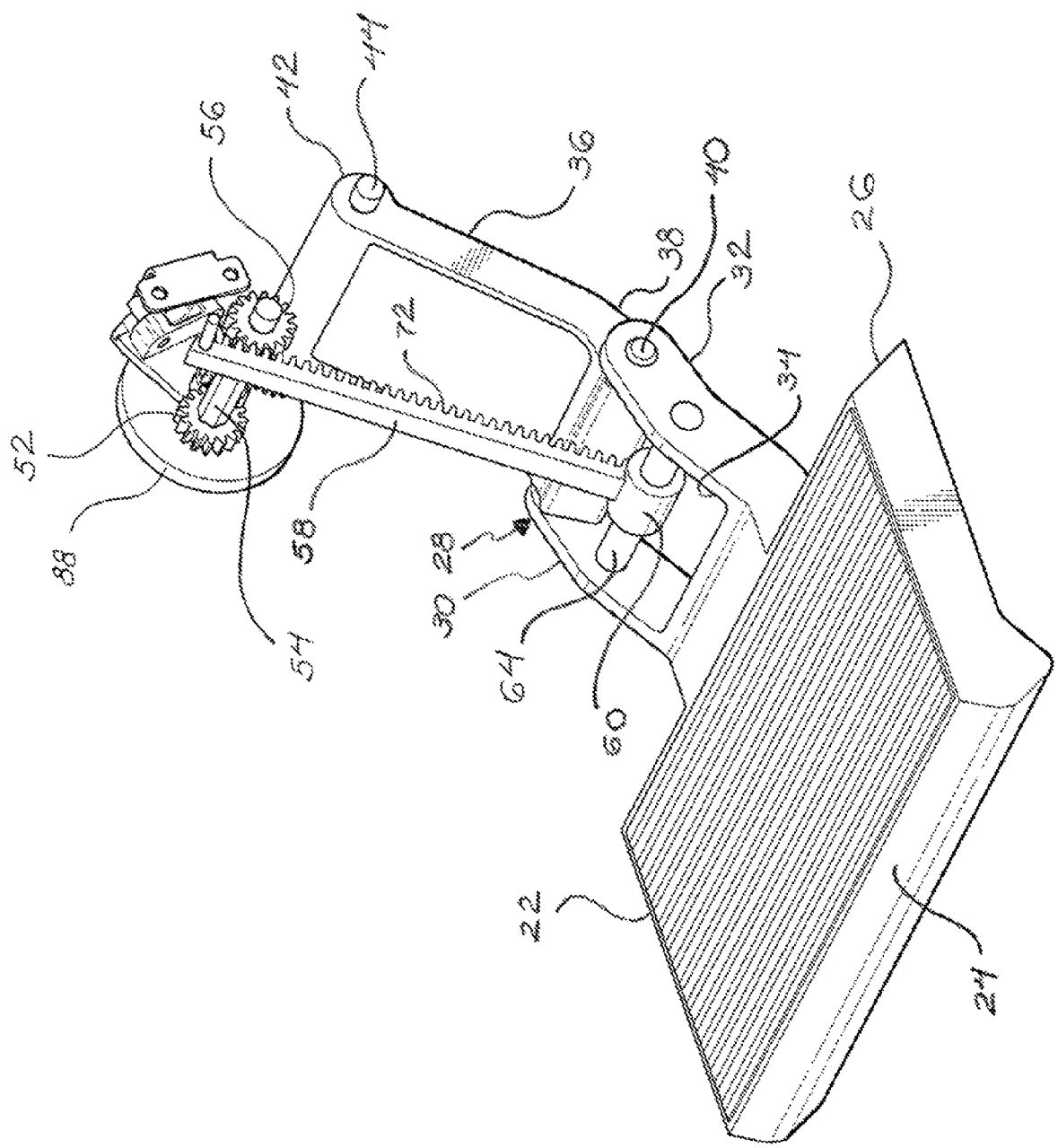
FIG. 3 is a perspective view of a rack link and pinion, drive shaft, and latch assembly for the step assembly.

Referring to FIG. 3, the step assembly 10 also includes an arm 36 having one end 38 pivotally coupled to the link 28 about a pivot pin 40, and an opposing end 42 fixedly secured to a drive shaft 44. One end of the drive shaft 44 is coupled to the mounting bracket 12 and the drive shaft 44 rotates relative to the mounting bracket 12. The pivotal movement of the arm 36 relative to the mounting bracket 12 and the link 28 moves the step 22 between a retracted position (as shown in FIG. 2) in which the step 22 is at least partially tucked below the mounting bracket 12 adjacent the underbody of the motor vehicle, and an extended position (as shown in FIG. 1) in which the step 22 is spaced further away from the mounting bracket 12 as well the underbody of the motor vehicle to receive individuals entering or exiting the motor vehicle.

Figure 4:
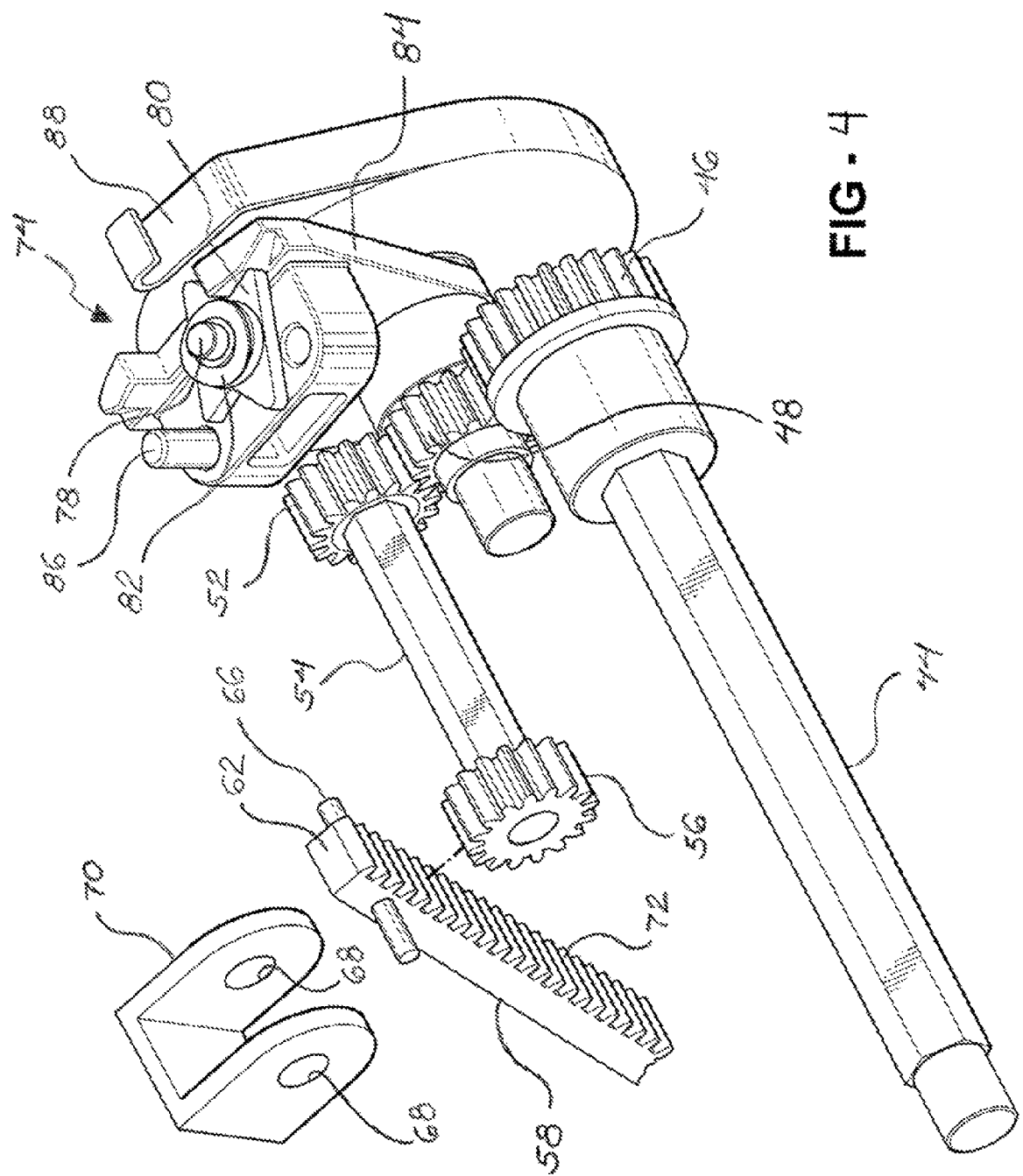
FIG. 4 is a perspective view of the drive shaft operably coupled to the latch assembly; assembly.
Figure 5:
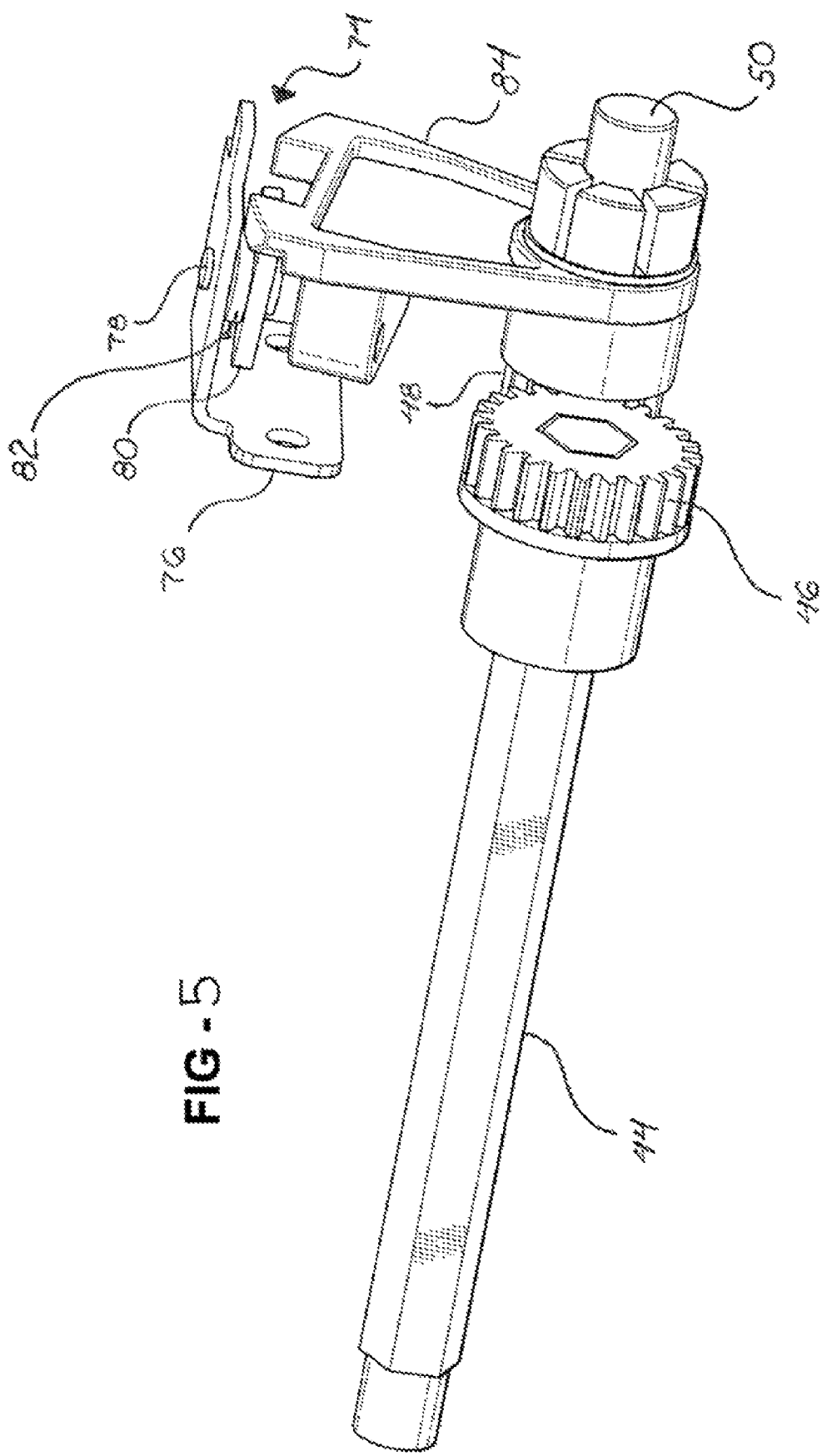
FIG. 5 is a perspective view of the step assembly with a mounting bracket cut away.

Referring to FIGS. 3 through 5, a drive gear 46 is fixedly secured along one end of the drive shaft 44. The drive gear 46 is in engagement with an intermediate gear 48 such that rotation of the drive shaft 44 causes rotation of the intermediate gear 48. The intermediate gear 48 is fixedly secured to an intermediate shaft 50. A rack drive gear 52 is in meshing engagement with the intermediate gear 48. The rack drive gear 52 is fixedly secured to one end of a pinion shaft 54. A pinion 56 is fixedly secured to an opposing end of the pinion shaft 54.

Figure 6:
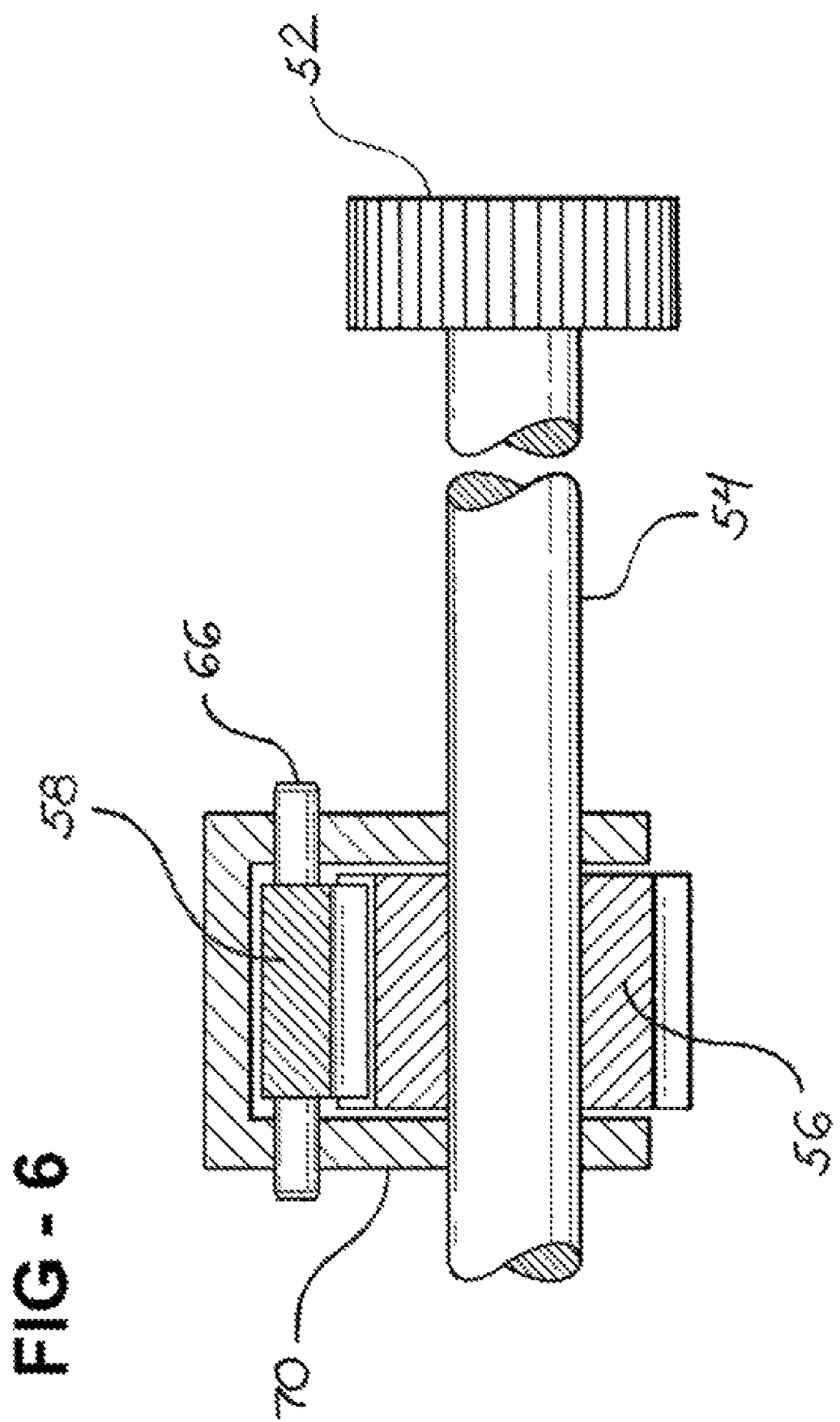
FIG. 6 is an isolated view of the rack link and pinion housed within a rack guide.

Referring to FIGS. 3, 4, and 6, a rack link 58 includes a first end 60 that pivots relative to the link 28, and a second end 62 that pivots relative to the mounting bracket 12. The first end 60 of the rack link 58 is fixedly secured to a pivot pin 64 extending between the link members 30, 32 of the link 28. The second end 62 of the rack link 58 includes a limit pin 66 extending out therefrom. The limit pin 66 is received within apertures 68 formed in a rack guide 70 which is fixedly secured to the outboard panel 14 of the mounting bracket 12. The rack guide 70 houses the pinion 56 and guides movement of the rack link 58. The limit pin 66 is rotatable relative to the rack guide 70 to allow the second end 62 of the rack link 58 to pivot relative to the mounting bracket 12.

The pinion 56, which is fixedly secured to the pinion shaft 54 and spaced apart from the rack drive gear 52, engages a plurality of teeth 72 formed along the rack link 58. The rotation of the pinion shaft 54 causes the pinion 56 to rotate. Rotational motion of the pinion 56 causes linear movement of the rack link 58 along the pinion 56.

Referring back to FIGS. 4 and 5, the step assembly 10 further includes a latch assembly, generally shown at 74, disposed within the cover member 20 for selectively retaining the step 22 in the retracted position. The latch assembly 74 includes a pawl mount 76 fixedly secured to the mounting bracket 12. A pawl rivet 78 extends through the pawl mount 76. A latch pawl 80 rotates about the pawl rivet 78 relative to the pawl mount 76. A wave washer 82 spaced the latch pawl 80 apart from the pawl mount 76.

The latch assembly 74 also includes a latch hub 84 fixedly secured to the intermediate shaft 50 for rotation therewith. The latch hub 84 includes a latch pin 86 extending out therefrom. A deploy spring 88 is coupled to the latch hub 84. The deploy spring 88 biases the latch hub 84 away from the latch pawl 80.

The latch pawl 80 selectively engages the latch hub 84. When the latch pawl 80 is in engagement with the latch hub 84, the latch assembly 74 retains the step 22 in the retracted position. When the latch pawl 80 releases the latch hub 84, the latch hub 84 rotates with the intermediate shaft 50 under the bias of the deploy spring 88 to allow the step 22 to move to the extended position.

In operation, starting with the step 22 in the retracted position, as shown in FIG. 2, and individual provides an initial "push" action to the step 22 to activate the step assembly 10. The initial push action on the step 22 causes the arm 36 to pivot relative to the mounting bracket 12 and link 28. Because the arm 36 is fixedly secured to the drive shaft 44, the drive shaft 44 rotates at the same time. Due to the meshing engagement between the drive gear 44 and intermediate gear 48, the intermediate shaft 50 also rotates. The latch hub 84, which is fixedly secured to the intermediate shaft 50, rotates out of engagement with the latch pawl 80 to release the step 22 from the latch assembly 74. An additional "push" action to the step 22 causes the step 22, assisted by the bias of the deploy spring 88, to move into the extended position. At the same time, the rack link 58 moves linearly relative to the pinion 56. The rack link 58 and pinion 56 provide controlled rotation of the step 22 relative to rotation of the arm 36.

To return the step 22 to the retracted position, an initial "push" action is applied to the step 22 to initiate pivotal movement of the arm 36. The drive shaft 44 rotates in response and, due to the meshing engagement between the drive gear 44 and the intermediate gear 48, the intermediate shaft 50 rotates. The latch hub 84 thus begins to rotate towards the latch pawl 80 against the bias of the deploy spring 88. An additional "push" action further pivots the arm 36 until the latch pawl 80 engages the latch hub 84 to retain the step 22 in the retracted position.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A step assembly for a motor vehicle, said step assembly comprising:
   a mounting bracket adapted to be attached to the motor vehicle;
   a step;
   an arm having a first end pivotal with respect to said mounting bracket and an opposing second end pivotal with respect to said step for pivotally moving said step between a retracted position and an extended position;
   a drive shaft fixedly secured to said first end of said arm and rotatable relative to said mounting bracket;
   an intermediate shaft operably coupled to said drive shaft and rotatable in response to rotation of said drive shaft; and
   a latch assembly including a latch hub fixedly secured to said intermediate shaft and rotatable therewith, said latch assembly including a latch pawl engageable with said latch hub to selectively retain said step in said retracted position and a deploy spring connected to said latch hub for biasing said latch hub out of engagement with said latch pawl when said latch pawl releases said latch hub.

2. A step assembly as set forth in claim 1 including a pinion shaft operably coupled to said drive shaft and rotatable in response to rotation thereof.

3. A step assembly as set forth in claim 2 including a pinion fixedly secured to said pinion shaft for rotation therewith.

4. A step assembly as set forth in claim 3 including a rack link including a plurality of teeth engaging said pinion for linear movement relative thereto as said step moves between said retracted position and said extended position.

5. A step assembly for a motor vehicle, said step assembly comprising:
   a mounting bracket adapted to be attached to the motor vehicle;
   a step;
   an arm having a first end pivotal with respect to said mounting bracket and a second end pivotally coupled to said step for moving said step between a retracted position and an extended position;
   a drive shaft fixedly secured to said first end of said arm and rotatable relative to said mounting bracket;
   a drive gear fixedly secured to said drive shaft;
   an intermediate gear engaging said drive gear for rotation therewith;
   a rack drive gear engaging said intermediate gear for rotation therewith;
   a pinion shaft fixedly supporting said rack drive gear therealong, said pinion shaft rotatable in response to rotation of said rack drive gear;
   a pinion fixedly mounted to said pinion shaft and rotatable in response to rotation of said drive shaft; and
   a rack link having a plurality of teeth engaging said pinion, said rack link moving linearly relative to said pinion as said pinion rotates to provide controlled movement of said step between said retracted and extended positions.

6. A step assembly as set forth in claim 5 including an intermediate shaft fixedly supporting said intermediate gear therealong.

7. A step assembly as set forth in claim 6 including a latch hub fixedly secured to said intermediate shaft and rotatable therewith.

8. A step assembly as set forth in claim 7 including a latch pawl engageable with said latch hub to selectively retain said step in said retracted position.

9. A step assembly as set forth in claim 8 including a deploy spring connected to said latch hub and biasing said latch hub out of engagement with said latch pawl.

10. A step assembly for a motor vehicle, said step assembly comprising:
   a mounting bracket adapted to be attached to the motor vehicle;
   a step including a link extending out therefrom;
   an arm having a first end pivotal with respect to said mounting bracket and an opposing second end pivotally coupled to said step for moving said step between a retracted position and an extended position, said second end of said arm abutting said link;
   a drive shaft fixedly secured to said first end of said arm and rotatable relative to said mounting bracket;
   an intermediate shaft operably coupled to said drive shaft and rotatable in response to rotation of said drive shaft;
   a pinion shaft operably coupled to said drive shaft and rotatable in response to rotation thereof; and
   a rack link having one end coupled to said mounting bracket and an opposing end coupled to said step, said rack link movable in a linear direction as said step moves between said retracted position and said extended position.

11. A step assembly as set forth in claim 10 including a pinion fixedly secured to said pinion shaft for rotation therewith.

12. A step assembly as set forth in claim 11 wherein said rack link includes a plurality of teeth engaging said pinion for linear movement relative thereto as said step moves between said retracted position and said extended position.

13. A step assembly for a motor vehicle, said step assembly comprising:
   a mounting bracket adapted to be attached to the motor vehicle;
   a step;
   an arm having a first end pivotal with respect to said mounting bracket and a second end pivotally coupled to said step for moving said step between a retracted position and an extended position;
   a drive gear operably coupled to said arm and rotatable upon pivotal movement thereof;
   an intermediate gear engaging said drive gear for rotation therewith;
   a rack drive gear engaging said intermediate gear for rotation therewith;
   a pinion operably coupled to said rack drive gear and rotatable in response to rotation thereof; and
   a rack link having a plurality of teeth engaging said pinion, said rack link moving linearly relative to said pinion as said pinion rotates to provide controlled movement of said step between said retracted and extended positions.

* * * * *